United States Patent
Hanson et al.

(10) Patent No.: US 6,814,362 B2
(45) Date of Patent: Nov. 9, 2004

(54) QUIET SHELF FOR AN AGRICULTURAL CART

(75) Inventors: Jeffery G. Hanson, Tillsonburg (CA); Anthony M. Platteeuw, Delhi (CA); Ernest L. Wilson, Ingersoll (CA)

(73) Assignee: Wellmaster Pipe and Supply, Inc., Tillsonburg (CA)

(*) Notice: Subject to any disclaimer, the term of this patent is extended or adjusted under 35 U.S.C. 154(b) by 0 days.

(21) Appl. No.: 10/079,526

(22) Filed: Feb. 22, 2002

(65) Prior Publication Data

US 2003/0160409 A1 Aug. 28, 2003

(51) Int. Cl.[7] ................................................ B62B 3/02
(52) U.S. Cl. .................. 280/79.3; 280/47.35; 248/250; 108/107
(58) Field of Search ..................... 280/79.3, 79.11, 280/79.7, 47.34, 47.35; 248/205.3, 250; 108/57.12, 106, 107, 108, 109

(56) References Cited

U.S. PATENT DOCUMENTS

| | | | | |
|---|---|---|---|---|
| 1,563,057 A | * | 11/1925 | Williams | 211/134 |
| 3,527,174 A | * | 9/1970 | Lay | 108/115 |
| RE28,244 E | * | 11/1974 | Evans | 108/157.13 |
| 3,971,568 A | * | 7/1976 | Wright | 280/33.996 |
| 4,458,906 A | * | 7/1984 | Lamson | 280/47.34 |
| 5,069,512 A | * | 12/1991 | Sykes | 312/139.2 |
| 5,406,894 A | * | 4/1995 | Herrmann et al. | 108/108 |
| 5,718,441 A | * | 2/1998 | Kern et al. | 280/79.3 |
| 5,749,589 A | * | 5/1998 | Hopkins et al. | 280/47.34 |
| 5,929,395 A | * | 7/1999 | Bizlewicz | 181/207 |
| 5,989,708 A | * | 11/1999 | Kreckel | 428/354 |
| 6,213,483 B1 | * | 4/2001 | Gaffney | 280/47.35 |
| 6,244,194 B1 | * | 6/2001 | Salmanson et al. | 108/55.1 |
| 6,569,521 B1 | * | 5/2003 | Sheridan et al. | 428/343 |
| 6,598,545 B2 | * | 7/2003 | Ryaboy et al. | 108/136 |

* cited by examiner

Primary Examiner—Christopher P. Ellis
Assistant Examiner—Brian L Swenson
(74) Attorney, Agent, or Firm—Dinnin & Dunn, P.C.

(57) ABSTRACT

A wheeled agricultural cart for transporting plant materials having at least one removable shelf. The shelf includes a planar shelf element for supporting the plant materials attached to a shelf frame by an adhesive material having a resiliently deformable thickness. The material maintains a vertically spaced part relationship between the shelf element and the frame, preventing them from rattling against one another.

10 Claims, 3 Drawing Sheets

QUIET SHELF FOR AN AGRICULTURAL CART

BACKGROUND OF THE INVENTION

1. Field of the Invention

The invention relates to agricultural carts used for transporting plant materials, such as nursery stock or potted plants, typically in a greenhouse environment and environs. More particularly, the invention relates to improved removable shelves for the aforementioned carts that do not create excessive noise due to shelf vibration when the cart is being moved.

2. Description of the Prior Art

In the greenhouse industry, carts are used to transport plant materials, such as nursery stock or potted plants. The carts have front and rear sets of wheels mounted to the underside of a base frame with a vertical pillar extending upwardly from each corner of the frame. At least one horizontal shelf is provided for supporting the plant materials being transported. The shelf may be attached to each vertical pillar, for example, by means of a hook at each corner of the shelf that is adapted for engagement in a corresponding slot at a pre-determined height on the vertical pillar. This allows the shelf to be readily removed from the cart or positioned at a different desired height.

The shelf is typically formed from L-shaped frame members of a galvanized metal material that are typically attached to one another, for example by welding, to form a substantially rectangular frame. The L-shaped members are oriented such that the frame has a horizontal flat surface inward of an upwardly extending rim. A planar shelf element is placed within the rim and supported by the flat surface of the frame. A plurality of frame cross-members may be provided across the width of the shelf at discrete intervals along the length of the frame to provide additional support to the shelf element. The shelf element is typically made from a galvanized sheet material or may alternatively be made from plywood or a perforated material, such as expanded metal, to allow dirt and debris to fall through the shelf element.

The shelf element is typically attached to the horizontal surface of the frame by means of fasteners, such as, for example, rivets. The rivets protrude from the bottom of the frame and can potentially cause injury to persons removing the shelf. When galvanized metallic materials are used to construct the shelf element, the riveting process requires the material to be punctured, thereby exposing an un-galvanized surface to environmental conditions with the potential for rust formation. As an alternative to riveting, a metallic shelf element is sometimes attached to the frame by means of spot welding. The spot welding process is well known to cause a loss of the galvanized coating from metal parts, again creating the potential for unsightly rust formation. Spot welding also creates a region of localized heating that embrittles the shelf element, leading to premature mechanical failure. Plywood shelf elements are typically attached to the frame by riveting as previously described. Over time, differences in the rate of thermal expansion of the frame and shelf element cause the holes formed by the rivets in the shelf element to oblate. This tendency towards oblation is exacerbated by vibration of the shelf element when the cart is in motion and eventually results in loss of attachment.

Since the bottom surface of the shelf element is in direct contact with the horizontal planar surface of the frame, vibration of the shelf element due to motion of the cart causes the shelf to rattle. The rattling produces a significant amount of noise, regardless of the material of construction of the shelf. The noise level created when transporting a plurality of concurrently rattling shelves poses a health and safety issue for greenhouse workers; accordingly, abatement of shelf noise levels is a top priority for greenhouse management.

The present invention seeks to address the aforementioned maintenance problems and moreover to reduce undesirable health and safety issues such as excessive greenhouse noise levels by providing an improved shelf for an agricultural cart.

SUMMARY OF THE INVENTION

According to the present invention, there is provided a cart for transporting plant material having a rectangular-like base frame with wheels thereunder and at least one shelf. The cart comprises vertical pillar members extending upwardly from the base frame for supporting the shelf therebetween, each pillar having first attachment means. The shelf has a frame, the frame having a planar surface for supporting a shelf element thereon. The shelf element is attached to the planar surface by an adhesive material having a resiliently deformable thickness. The shelf element is vertically separated from the planar surface by the thickness of the adhesive material to thereby reduce the vibration of the shelf element. The frame has second attachment means complementary to the first attachment means for removable attachment of the shelf to each pillar.

According to another aspect of the present invention, there is provided a method of assembling a shelf for a cart used to transport plant materials. The method comprises the following steps: preparing a rectangular-like frame having planar surfaces for supporting a shelf element thereon; applying a resiliently deformable adhesive material to the planar surfaces; positioning a shelf element above the planar surfaces; applying the shelf element into engagement against the adhesive material; curing the adhesive material under ambient conditions.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which.

PREFERRED EMBODIMENT

Figure 1:
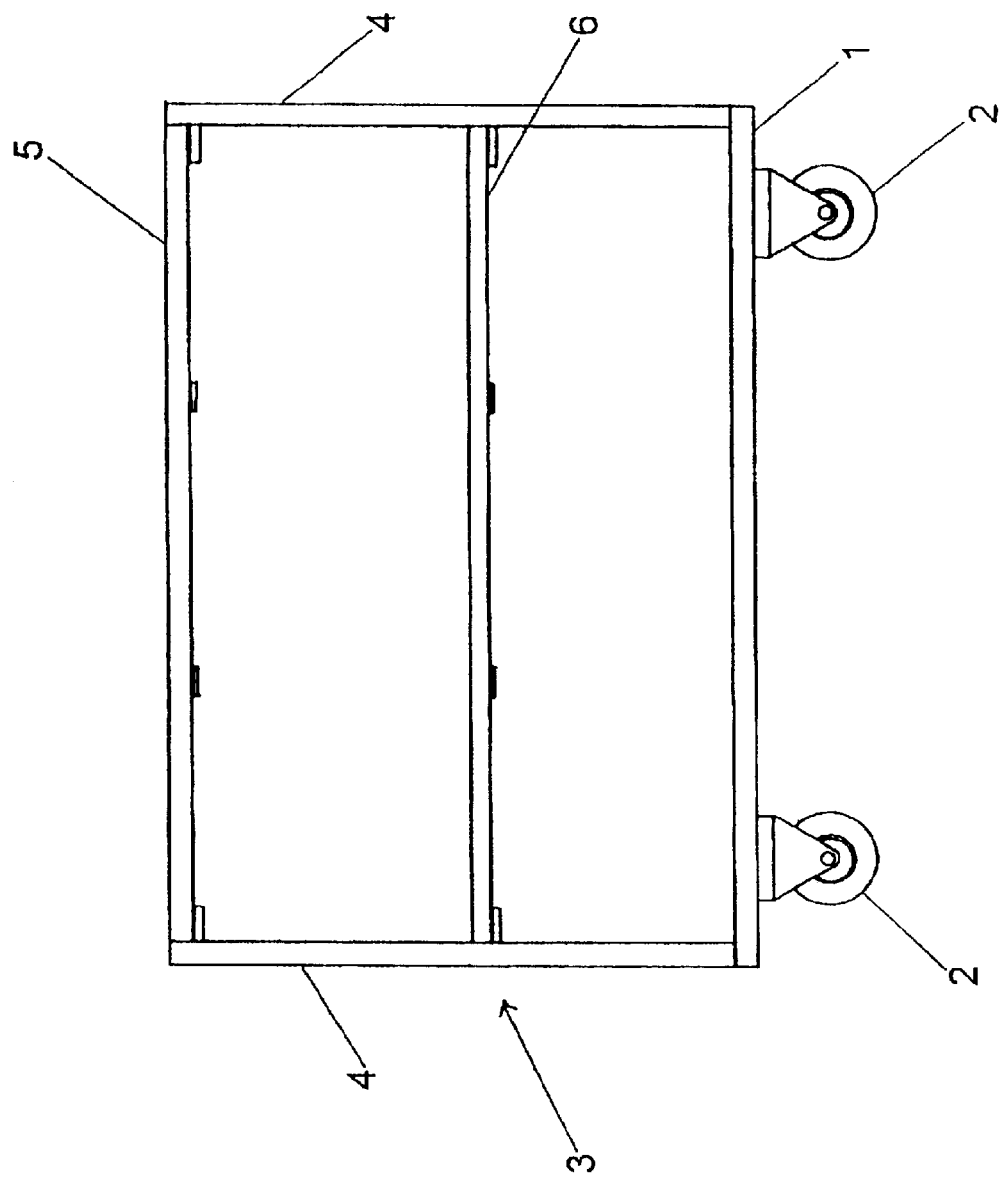
FIG. 1 is a side view of an agricultural cart with removable shelves.

The agricultural cart shown in FIG. 1 has a base frame 1, having wheels 2 attached to the underside thereof. The base frame 1 is substantially rectangular and is typically made from a galvanized metallic material. The wheels may be, for example, casters that are independently attached at each corner of the base frame. Some or all of the casters may be allowed to freely rotate about a vertical axis, permitting steering movement of the cart. Alternatively, the wheels may be of the common pneumatic type that are typically connected by an axle for steering in a conventional manner.

A shelf rack 3 is attached to the top of the base frame 1. The shelf rack 3 comprises a vertical pillar 4 extending upwardly from each corner of the base frame 1. Horizontal rails 5 are used to provide structural support for the pillars 4, especially at their uppermost ends as shown, but also potentially at other vertical positions (not shown). Diagonal cross-members (not shown) may similarly be provided to increase the structural rigidity of the rack 3. Each vertical pillar 4 typically has four sides and is adapted to permit removable attachment of at least one horizontal shelf 6 as will hereinafter be described, by way of example.

Figure 2:
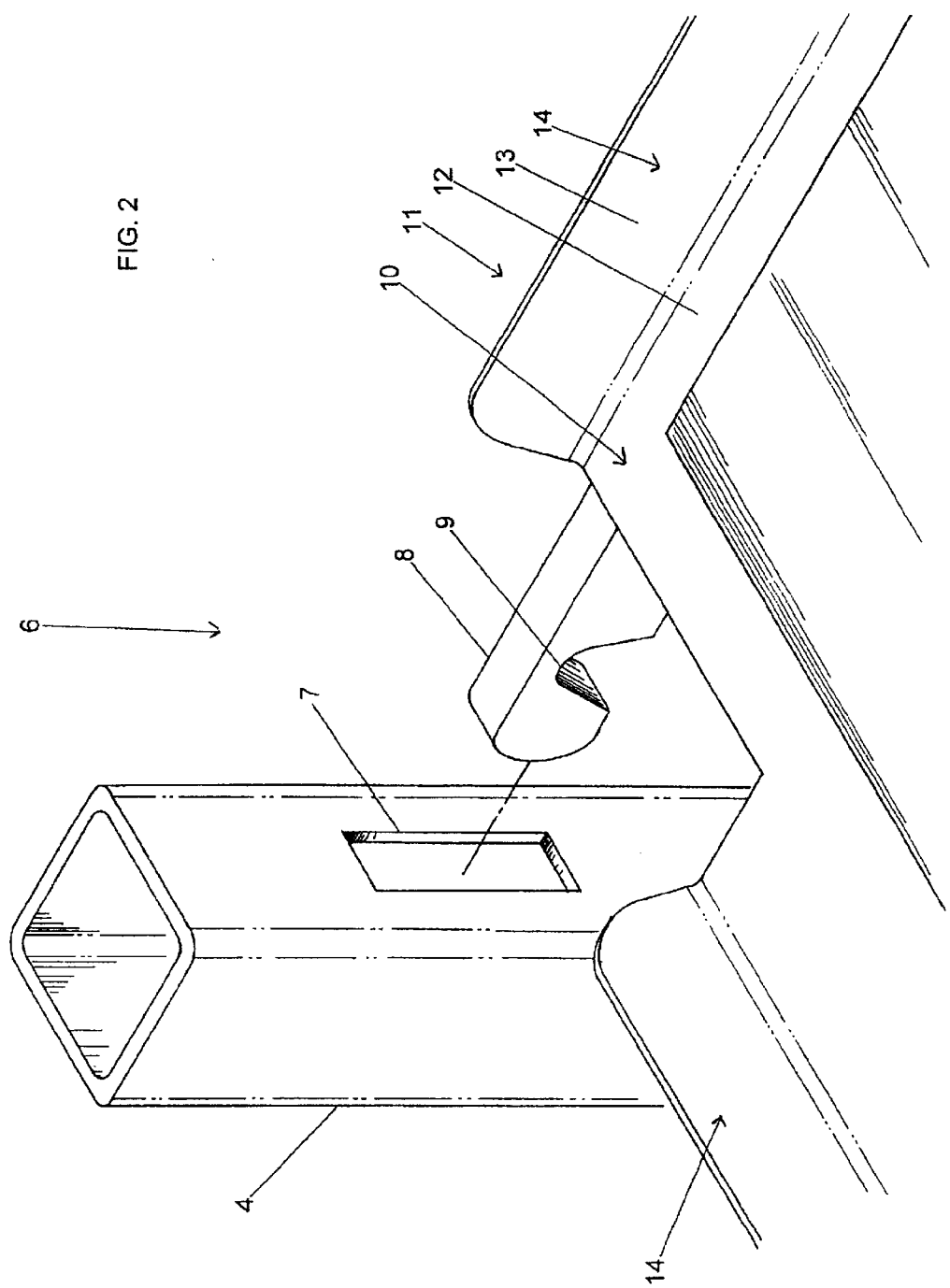
FIG. 2 is an exploded perspective illustration of the removable attachment of a shelf to a cart.

Referring to FIG. 2, on the side of each pillar 4 facing inwardly toward the length of the cart, a plurality of substantially rectangular vertical slots 7 is provided at discrete height intervals. Each slot 7 is adapted to recieve a hook member 8, having a substantially rectangular cross section and a length with a downward facing notch 9 proximal to one end thereof. The hook member 8 is attached to the underside of the shelf 6 and oriented with its length parallel to the length of the shelf. To attach the shelf 6 to the rack 3, the hook member 8 is longitudinally inserted into the slot 7 and lowered until the interior of the notch 9 engages the lower edge of the slot 7, thereby securing the hook 8 within the pillar 4. By choosing a slot 7, the shelf 6 may be positioned at any desirable pre-determined height on the rack 3, thereby permitting a plurality of shelves 6 to be vertically stacked on the same rack 3. The shelves 6 need not necessarily be horizontal; an oblique angle may be imparted to a shelf 6 by attaching opposite corners of each end of the shelf to their respective pillar 4 at different heights. Although one example of a removable attachment means has been given, those skilled in the art will appreciate that the shelf 6 may be attached to the rack 3 by any suitable means without departing from the scope of the present invention.

Figure 3:
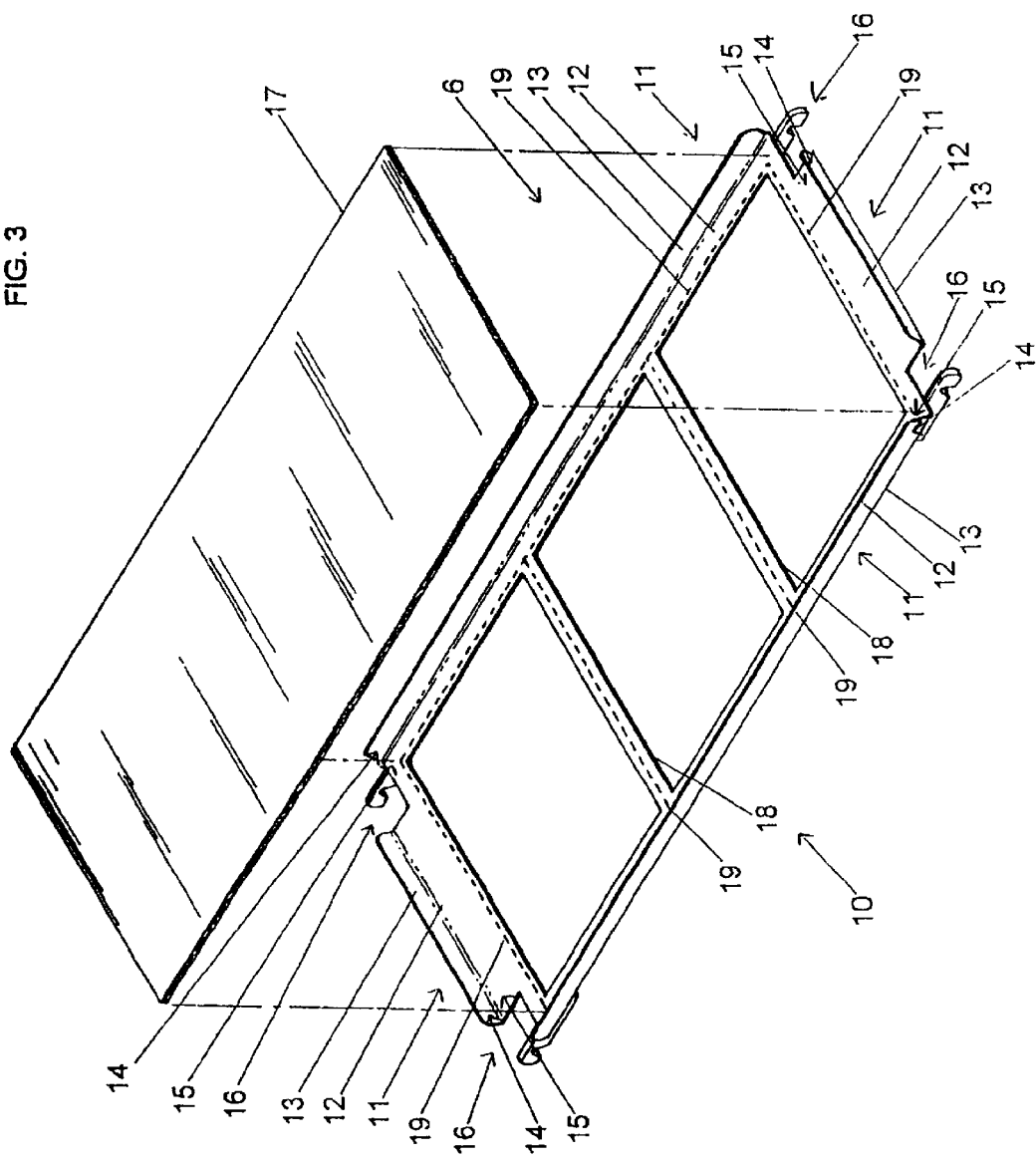
FIG. 3 is an exploded perspective view of a shelf assembly.

Referring to FIG. 3, the shelf 6 includes a substantially rectangular-like frame 10. The frame 10 is assembled, for example, using a plurality of L-shaped frame members 11. Each frame member 11 is oriented such that there is a lower portion 12 with a horizontal planar surface and an upper portion 13 with a vertical planar surface. When assembled, the upper portions 13 form a rim 14 along substantially the outermost boundary of the frame 10 and the lower portions 12 project inwardly from the rim 14 to form a supporting surface 15. Each frame member 11 is typically made of a galvanized metallic material and attached at right angles to the adjacent frame member, typically by welding. Each corner of the frame 10 has a recess 16 with right angled sides, approximately corresponding in dimensions to the inward facing sides of the vertical pillar 4, thereby creating a discontinuity or gap in the rim 14. Each hook member 8 is attached to the underside of the frame 10 such that the end proximal to the notch 9 projects outwardly along the length of the shelf 6 beneath the recess 16, but not substantially beyond the rim 14. When the shelf 6 is attached to the rack 3 as previously described, each vertical pillar 4 is accommodated within the recess 8. The outer dimensions of the shelf 6 therefore do not extend substantially beyond the outer dimensions of the cart.

The shelf 6 also includes a planar shelf element 17 with a surface upon which plant materials are transported. The shelf element 17 is placed within the rim 14 above the horizontal planar supporting surface 15. A plurality of frame cross-members 18 spanning the width of the frame 10 may be fixedly attached, for example by welding, at intervals along the length of the frame 10 to provide additional support to the shelf element 17. Each frame cross-member 18 typically includes a horizontal planar surface that is oriented parallel to and forms part of the supporting surface 15. Although typically made from a galvanized sheet material, the shelf element 17 may alternatively be made from a corrugated plastic material or wood. This minimizes maintenance required as a result of rust formation, and reduces the weight and cost of the shelf 6. Plastic shelf elements also have less tendency toward rattling than other materials. The plastic shelf 6 may also be attractively finished and optionally printed with desired markings, such as a company logo. With any material of construction, the shelf element 17 is sometimes perforated to allow dirt and debris from transported plant materials to fall through.

In order to minimize the potential for noise formation due to vibration, the shelf element 17 is attached to the frame 10 using an adhesive material, illustrated with a dashed line 19, having a thickness in the vertical direction. The adhesive material 19 therefore maintains a vertically spaced apart relationship between the horizontal planar surfaces of the shelf element 17 and the supporting surface 15, preventing the surfaces from rattling against one another during transport. The thickness of the adhesive material 19 is resiliently deformable, allowing variation in the separation distance between the surfaces in response to vibration of the shelf element 17. The adhesive material 19 is preferably continuously applied to the supporting surface 15; however, a series of lengths of the material 19 may also be applied periodically, leaving gaps between adjacent lengths, without compromising the functionality of the material.

The adhesive material 19 is carefully selected based on the following criteria: the material must maintain resiliency as it ages; it must retain adhesive strength through a variety of environmental conditions; it should be easy to apply, with a minimal amount of mixing or special surface preparation; it should preferably cure without special conditions or the release of harmful vapors; it should be low in cost and readily commercially available. There are at least two types of materials that generally meet the foregoing criteria: foam tapes and adhesive pastes. Through testing, it has been determined that the preferred class of material is a polyurethane adhesive paste, such as, for example, 3M Scotch-Seal™ 560 or 3M ScotchSeal™ 540. Very high bond (VHB) foam tapes, such as 3M VHB™ 4622, have also been tested and found acceptable, though less desirable, as they do not retain sufficient adhesive strength over time.

Test 1—Environmental Cycling and Heat Aging

Tests were conducted to determine the effect of environmental cycling and heat aging on the adhesive material. Twelve samples were bonded with 3M ScotchSeal™ 560 and split into three groups of four samples each. The first group were used as control samples and placed in a constant temperature room at 25° C., 50% relative humidity. The second group was placed in an oven at a temperature of 70° C. for one week. In this tests, one week of exposure at 70° C. was considered analogous to one year of aging. The third group was placed in an environmental chamber and cycled continuously for one week at the following conditions: 49° C., 90% relative humidity for 8 hours; 18° C., 50% relative humidity for four hours; −29° C. for four hours. The samples were tested for dynamic overlap shear with the following results:

| Sample # | 1 (psi) | 2 (psi) | 3 (psi) | 4 (psi) | Average (psi) |
|---|---|---|---|---|---|
| Control | 298.4 | 291.1 | 232.84 | 249.0 | 267.8 |
| Heat Aged | 259.6 | 344.3 | 339.7 | 295.6 | 309.8 |
| Cycled | 301.3 | 357.4 | 282.9 | 298.9 | 310.1 |

The results generally indicated that the heat aged and environmentally cycled samples performed as well as the control samples.

Test 2—Prolonged Heat Aging

Tests were conducted to determine the effect of prolonged heat aging on the adhesive material. Nine samples were bonded with 3M ScotchSeal™ 560 and split into three groups of three samples each. The first group were used as control samples and placed in a constant temperature room at 25° C., 50% relative humidity. The second group was placed in an oven at a temperature of 70° C. for three weeks. The third group was placed in an oven at a temperature of 70° C. for five weeks. In these tests, one week of exposure at 70° C. was considered analogous to one year of aging. The samples were tested for dynamic overlap shear with the following results:

| Sample # | 1 (psi) | 2 (psi) | 3 (psi) | Average (psi) |
|---|---|---|---|---|
| Control | 202.7 | 288.5 | 356.4 | 282.5 |
| 3 Year | 249.4 | 314.0 | 348.6 | 304.0 |
| 5 Year | 381.6 | 263.4 | 331.7 | 325.6 |

The results generally indicated that the heat aged samples performed as well as the control samples.

Test 3—Noise Abatement

Tests were conducted to determine the effectiveness of the adhesive material for noise abatement. A conventional shelf, having a galvanized metal shelf element riveted to a galvanized metal frame, was compared to a shelf according to the present invention, having a galvanized metal shelf element adhesively attached to a galvanized metal frame using 3M ScotchSeal™ 560. Shelves were placed on a cart and rolled over a simulated bump in the floor. Measurements of sound level were taken at low (1000 Hz), medium (4000 Hz), and high (16000 Hz) frequencies with a sound level meter equipped with an octave band analyzer. Results were as follows:

Low Frequency (1000 Hz)

| Sample # | 1 (dB) | 2 (dB) | 3 (dB) | 4 (dB) | Average (dB) |
|---|---|---|---|---|---|
| Adhesive | 71.5 | 70.9 | 70.5 | 69.9 | 70.7 |
| Riveted | 69.9 | 70.9 | 73.8 | 71.1 | 71.4 |

The results generally indicated that there was no noticeable sound difference between the two shelves at low frequency.

Medium Frequency (4000 Hz)

| Sample # | 1 (dB) | 2 (dB) | 3 (dB) | 4 (dB) | Average (dB) |
|---|---|---|---|---|---|
| Adhesive | 61.8 | 64.8 | 63.2 | 63.7 | 63.4 |
| Riveted | 73.2 | 70.7 | 72.4 | 71.1 | 71.8 |

The results generally indicated that there was a noticeable sound difference (8.4 dB) between the two shelves at mid frequency.

High Frequency (16000 Hz)

| Sample # | 1 (dB) | 2 (dB) | 3 (dB) | 4 (dB) | Average (dB) |
|---|---|---|---|---|---|
| Adhesive | 56.1 | 57.8 | 57.0 | 55.2 | 56.5 |
| Riveted | 71.2 | 68.4 | 69.9 | 70.5 | 70.0 |

The results generally indicated that there was a very noticeable sound difference (13.5 dB) between the two shelves at high frequency.

The preferred polyurethane adhesive sealant comprises the following chemical constituents: urethane polymer; poly (vinyl chloride) polymer; xylene; petroleum distillate; p,p'—methylenebis (phenyl isocyanate); plasticizers. Additional incidental constituents may also be included, provided that they do not compromise the function of the material, such as: colourants, for example, titanium dioxide and iron oxide; UV stabilizers, for example, carbon black; water; and entrapped gases. The adhesive is commercially available in black, grey, or white colours.

Returning to FIG. 3, a method of assembling the shelf 6 generally comprises the following steps. Firstly, the frame members 11, hook members 8, and cross-members 18 are attached as previously described to form the frame 10. Optionally, the surface may be galvanized or attractively finished by painting and cleaned of any dirt or residual oils. Secondly, the adhesive material 19 is applied in either a continuous or semi-continuous manner as previously described. Thirdly, prior to complete curing of the adhesive material 19, the planar shelf element 17 is positioned within the rim 14 above the supporting surface 15. Fourthly, the shelf element 17 is applied into engagement with the adhesive material 19 by downwardly pressing it against the adhesive material 19, thereby deforming the thickness of the material. Care must be exercised during this step to avoid complete deformation of the thickness of the adhesive material 19, in order to provide sufficient vertical separation between the shelf element 17 and the support surface 15 to prevent them from rattling against one another. Fifthly, the adhesive material 19 is cured under ambient conditions, typically for two to five days. It will be understood by those skilled in the art that the foregoing generally describes by way of example a method of assembly of the shelf 6, however, certain intermediate detailed steps have been deleted for clarity. Accordingly, minor variations from the foregoing are encompassed by the method of the present invention.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having described the invention, what is claimed is:

1. An agricultural cart in combination with nursery or potted plants for transporting plant material having a rectangular-like base frame with wheels thereunder and at least one shelf, said cart comprising:
   a) vertical pillar members extending upwardly from said base frame for supporting said shelf therebetween, each pillar having first attachment means;
   b) said shelf having a shelf frame, said shelf frame having rectangular like shave with at least one cross member, said shelf frame having a planar surface for supporting a shelf element thereon, said shelf element attached to said planar surface by adhesive material having a resiliently deformable thickness, said shelf element vertically separated therefrom by said thickness to thereby reduce the vibration of said shelf element to reduce shelf noise when the cart is being moved; and
   c) said shelf frame having second attachment means complementary to said first attachment means for removable attachment of said shelf frame to each said pillar.

2. The cart of claim 1, wherein said adhesive material comprises a foam tape and/or an adhesive paste.

3. The cart of claim 2, wherein said adhesive material is a polyurethane adhesive paste.

4. The cart of claim 3, wherein said adhesive material comprises: urethane polymer; poly (vinyl chloride) polymer; xylene; petroleum distillate; and, p,p'-methylenebis(phenyl isocyanate).

5. The cart of claim 2, wherein said adhesive material has a length, said length continuous along said planar surface.

6. The cart of claim 2, wherein said adhesive material has a length, a series of lengths of said adhesive material periodically placed along said planar surface.

7. The cart of claim 1, wherein said first attachment means includes a plurality of vertical slots.

8. The cart of claim 7, wherein said second attachment means includes a hook member having a downward facing notch for engagement in said slot.

9. The cart of claim 8, wherein said base frame has four corners, said vertical pillar members extending upwardly from each said corner; and wherein said shelf frame has four corners, said hook members attached to said shelf frame at substantially each said corner.

10. The cart of claim 2, wherein said shelf element is made from a plastic material, a metallic material, or a wooden material.

* * * * *

UNITED STATES PATENT AND TRADEMARK OFFICE
CERTIFICATE OF CORRECTION

PATENT NO. : 6,814,362 B2
DATED : November 9, 2004
INVENTOR(S) : Jeffery G. Hanson et al.

It is certified that error appears in the above-identified patent and that said Letters Patent is hereby corrected as shown below:

Column 7,
Line 17, please delete "shave" and insert -- shape -- after "rectangular like".

Signed and Sealed this

Sixth Day of December, 2005

JON W. DUDAS
*Director of the United States Patent and Trademark Office*